Oct. 17, 1967     J. HORSCH     3,347,042

TORQUE CONVERTER CHARGING VALVE

Filed April 11, 1966     3 Sheets-Sheet 1

INVENTOR.
JOACHIM HORSCH

BY Fryer, Tjensvold, Feix & Phillips
ATTORNEYS

Oct. 17, 1967  J. HORSCH  3,347,042
TORQUE CONVERTER CHARGING VALVE
Filed April 11, 1966  3 Sheets-Sheet 2
Fig-3-
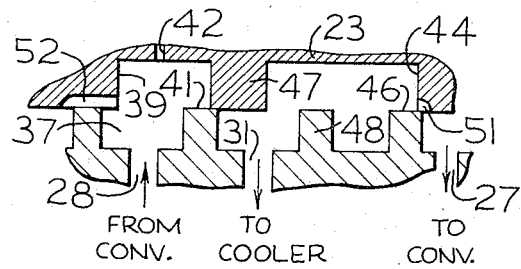
Fig-4-
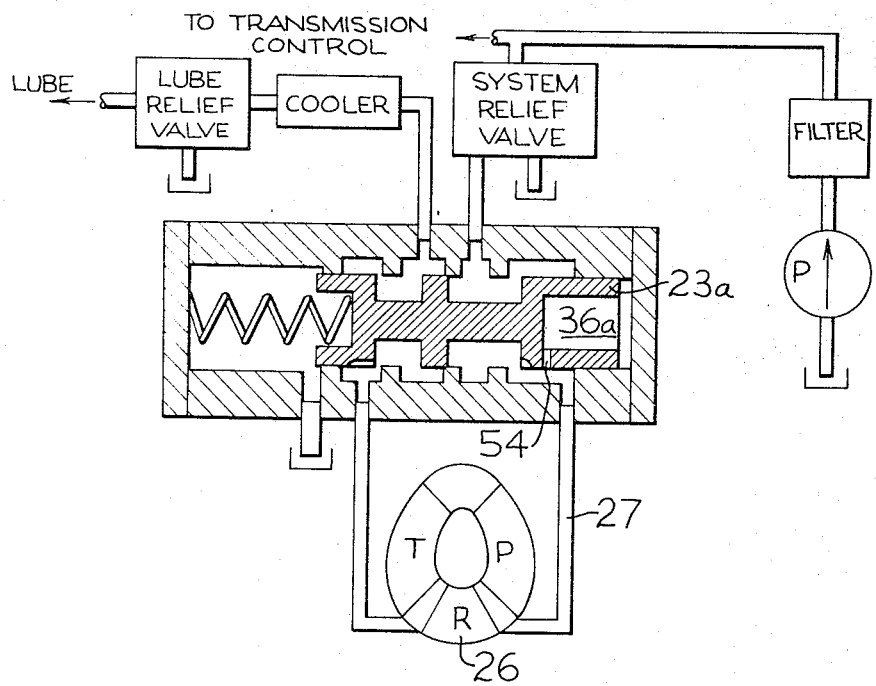
INVENTOR.
JOACHIM HORSCH
BY Fryer, Tjensvold, Feix & Phillips
ATTORNEYS Oct. 17, 1967    J. HORSCH    3,347,042
TORQUE CONVERTER CHARGING VALVE
Filed April 11, 1966    3 Sheets-Sheet 3

INVENTOR.
JOACHIM HORSCH
BY
Fryer, Tjensvold, Feix & Phillips
ATTORNEYS

United States Patent Office 3,347,042
Patented Oct. 17, 1967

3,347,042
TORQUE CONVERTER CHARGING VALVE
Joachim Horsch, Washington, Ill., assignor to Caterpillar Tractor Co., Peoria, Ill., a corporation of California
Filed Apr. 11, 1966, Ser. No. 541,781
6 Claims. (Cl. 60—54)

The present invention relates to charging valves, and more particularly to a torque converter charging valve which operates to establish desired pressures in a torque converter for particular operating conditions, and at the same time prevent excessive pressures from being established. The valve of the present invention accomplishes the desired results with a single spring actuated valve spool in a single bore, in contrast to the two or more valves presently used by prior art systems for accomplishing the same results.

There are three general classes of charging valve systems presently employed in conjunction with torque converters for controlling the pressure of the working fluid in the torque converter. The first of these known systems includes a safety relief valve at the inlet to the torque converter, and a relief valve at the outlet of the torque converter, wherein each relief valve requires a separate spool and spring since the pressures to which the two valves respond are different. A second class includes a converter charging valve which senses the inlet pressure to the torque converter and, as a function of that pressure, adjusts the outlet pressure. While systems of this type may be realized with a single valve spool, they do not protect the torque converter from excessive output pressures which may occur due to a restriction downstream of the outlet of the torque converter. Since the outlet of the torque converter characteristically feeds the input of a cooler (heat exchanger), a restriction downstream of the outlet of the torque converter is to be expected in cold weather starting conditions. The third type of charging valve system is similar to the first described, but excludes a safety relief valve at the inlet of the torque converter, and relies solely on an outlet relief valve to prevent excessive pressures from acting on the torque converter housing. These systems depend for proper operation on a lower downstream pressure than the regulated pressure, and consequently do not provide the necessary regulation when the cause of excessive output pressure is due to a restriction downstream, such as at the cooler. Thus, once again cold weather starting conditions create a potential damaging situation to the torque converter.

From the foregoing it is made clear that as presently known in the art a single valve is not sufficient to provide all of the regulation and protection desired for a torque converter charging valve, and only by using two or more separate valves are the desired results achieved.

Accordingly, it is an object of the present invention to provide a torque converter charging valve having a single spring urged valve spool in a single bore which operates to protect the torque converter from excessive pressures, even when those pressures are caused by downstream restrictions such as occur in coolers.

A further object of the present invention is to provide a torque converter charging valve having a single spring urged valve spool in a single bore which operates to protect not only the torque converter from experiencing excessive pressure, but also protects the cooler associated with the torque converter from similar hazards.

Further and more specific objects of the present invention are made apparent in the following specification wherein a preferred form of the invention is described by reference to the accompanying drawings.

In the drawings:

FIG. 3 is an enlarged view of a portion of the valve spool and valve bore defining housing of FIGS. 1 and 2 showing the relationship of these members under extreme cold weather starting conditions;

FIG. 4 is an illustration very similar to that of FIGS. 1 and 2, illustrating an alternate embodiment of the invention wherein the pressure which controls the operation of the charging valve is the torque converter inlet pressure as opposed to the torque converter outlet pressure which acts as the controlling pressure in the embodiments of FIGS. 1 and 2;

Figure 1:
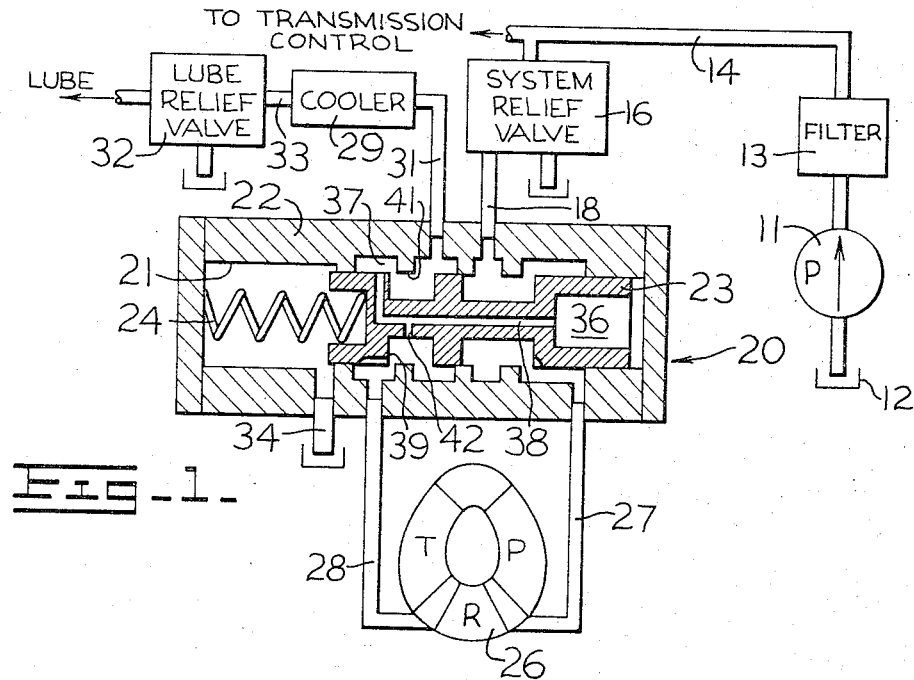
FIGS. 1 and 2 are semi-schematic illustrations of a torque converter system including a charging valve of the present invention wherein the charging valve is shown in two different operating positions.
Figure 2:
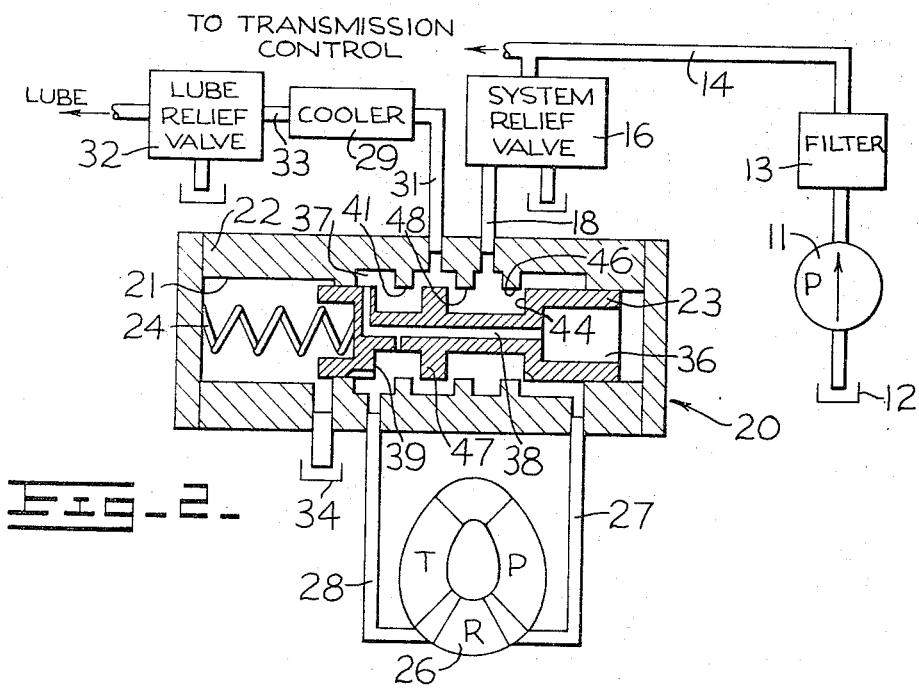

Referring now to FIGS. 1 and 2, a pump 11 draws fluid from a sump 12 and directs it through a filter 13 to a conduit 14 which leads to a hydraulically operated system such as a transmission control (not shown), as well as to a system relief valve 16. The system relief valve 16 operates to prevent the pressure in conduit 14 from building up above a predetermined pressure by diverting a portion of the fluid supplied by pump 11 to conduit 18. Conduit 18 leads to the torque converter charging system which is maintained at a lower pressure than conduit 14. Since the pump 11 is designed to provide fluid at a rate which exceeds that necessary to merely maintain the conduit 14 at the desired pressure level, the system relief valve 16 is normally diverting fluid to conduit 18 whereby the torque converter charging system is not starved for operating fluid.

The conduit 18 leads to a valve bore 21 which is defined by a valve housing 22 and which encloses a slidably disposed valve spool 23 which is urged toward one end of the housing 22 by an axially disposed spring 24. The housing 22 and valve spool 23 comprise the charging valve 20 of the present invention which operates to control the pressure of working fluid directed to a torque converter 26 through a conduit 27 and directed away from the torque converter by a conduit 28.

The valve bore 21 also communicates with an oil cooler (heat exchanger) 29 via a conduit 31. The output from cooler 29 is directed to a lubrication relief valve 32 by way of connecting conduit 33. Thus, in operation, fluid flows from pump 11 through relief valve 16 across valve spool 23 to the inlet conduit 27 of torque converter 26, and then back across the valve spool 23 by way of conduit 28 to conduit 31 which leads to the cooler 29 from which the fluid is directed to a lube relief valve 32. While this is the general fluid path for normal operating conditions, the bore 21 also communicates with a sump 34 which forms part of the fluid path under certain conditions which will be described in greater detail below.

By virtue of the single valve spool 23 and its associated valve bore 21, the torque converter 26 operates at the desired pressure for given conditions and is protected against excessive pressures including those which are caused by highly restrictive conditions existing in the cooler 29. It should be pointed out that the system relief valve 16 does not serve the same function as those relief valves which are disposed in the input conduit of torque converters as described above. The system relief valve 16 is designed to relieve fluid from conduit 14 at a pressure which is determined by the requirements of the other hydraulic controls to which the pump provides working fluid, such that the input pressure requirements of the torque converter 26 are not satisfied by the operation of the system relief valve but are determined instead by the torque converter charging valve. Similarly, the lube relief valve 32 does not provide any protection for the torque converter as would a relief valve disposed in the conduit 28. Thus, while all systems customarily include a system relief valve and a lube relief valve, the present invention provides an advance in the art by controlling the pressure in the torque converter 26 through the operation of a single valve spool 23 in a single bore 21 as opposed to two separate valve structures at the input and output of the torque converter 26.

Referring now primarily to FIG. 1, and assuming normal temperature conditions, fluid bypassed by relief valve 16 is directed to conduit 18 which leads through bore 21 and across the valve spool 23 to the inlet conduit 27 of the torque converter 26. Fluid is discharged from the torque converter 26 through outlet conduit 28 which directs the fluid back through the bore 21 and back across the valve spool 23 to a conduit 31 which leads to the cooler 29. The outlet pressure of torque converter 26 is reflected in a valve spool chamber 36 by virtue of the communication which exists between the chamber 36 and the outlet conduit 28 by way of annular chamber 37 in valve body 22, and an internal passageway 38 in valve spool 23.

A shoulder 39 on valve spool 23 cooperates with a valve bore land 41 to establish a metering annulus between the output conduit 28 from torque converter 26 and the conduit 31 to heat exchanger 29. This metering annulus causes a pressure rise in conduit 28 which is reflected in chamber 36, and which operates to urge the valve spool 23 in a direction which opposes the spring 24. Under normal conditions (not low temperature) the system will reach equilibrium after the valve spool 23 has moved slightly leftwardly against spring 24 so as to reduce the restriction formed by shoulders 39 and land 41. Under these equilibrium conditions the outlet pressure (80 p.s.i. for example) in conduit 28 is determined by the spring force and the reaction area of spool 23.

A small diameter bore 42 (small in comparison to passageway 38) in the valve spool 23 provides an additional path between the interior of valve bore 21 and chamber 36 to preclude the possibility of hydraulic lock in the event that the main path between chamber 36 and chamber 37 should become blocked.

In cold weather starting conditions, it is usual for the outlet pressure of converter 26 to be greater than when the system has been operating and the working fluid has been warmed. During cold weather starting conditions, the cooler 29 presents more of a restriction than during a normal temperature operation and causes a rise in the pressure in annular chamber 37 which, as described above, is reflected in the valve spool chamber 36. This rise in pressure causes the valve spool to move further leftwardly against spring 24 wherein the annular restriction between the shoulder 39 and land 41 creates less of a pressure drop between the outlet of torque converter 26 and the inlet of heat exchanger 29. This leftward movement of valve spool 23 positions a shoulder 44 of spool 23 sufficiently close to a valve bore land 46 to create an annular restriction between the valve inlet conduit 18 and torque converter inlet conduit 27. This restriction coupled with the axial separation of valve spool land 47 from valve bore land 48 which creates an annular opening that connects conduit 18 with conduit 31, results in a portion of the incoming fluid from conduit 18 being diverted directly to the cooler 29 without first passing through torque converter 26. Thus, by sensing the restriction in cooler 29 the charging valve of the present invention operates not only to adjust the conditions at the outlet of torque converter 26, but also adjust the conditions at the inlet so as to establish the desired operating pressures and prevent excessive, and potentially damaging pressures from being established. As the working fluid heats up, the restriction presented by cooler 29 decreases and the charging valve returns to the normal operating conditions position as shown in FIG. 1.

Under very extreme cold weather starting conditions, the restriction in heat exchanger 29 will produce greater pressure in chamber 36 than that which produced the movement shown in FIG. 2, and will result in the further compression of spring 24 until the valve spool and valve bore are in the relative position illustrated in FIG. 3. Under these conditions the path between conduit 18 and inlet conduit 27 to torque converter 26 is by way of metering slots 51 are formed in shoulder 44, and the communication between outlet conduit 28 from torque converter 26 and inlet conduit 31 to cooler 29 it interrupted by the axial overlapping of valve spool land 47 and valve bore land 41. An alternative low pressure path is established for the torque converter outlet through the metering slots 52 in shoulder 39 which leads to the sump 34. Thus, by effectively disconnecting the output of the torque converter from the inlet to the cooler the high pressure which is established at the inlet of the cooler is not reflected back to the outlet of the torque converter and allows the torque converter outlet pressure to be maintained at a lower pressure than the cooler inlet pressure. Since the annular opening between the valve spool land 47 and valve bore land 48 is increased by the leftward movement of valve spool 23, most of the fluid from conduit 18 flows freely to the cooler 29 without first passing through the torque converter 26. As the fluid rises in temperature, the restriction in the heat exchanger 29 diminishes and the valve spool gradually moves rightwardly until the normal operating position of FIG. 1 is reestablished.

The position of the valve spool 23 in the valve bore 21 is at its extreme leftward position when it reaches that position illustrated in FIG. 3. Any further leftward movement of the valve spool would block all fluid to inlet conduit 27 which would result in a drop of pressure at the outlet of the torque converter and the chamber 36 resulting in rightward movement of the valve spool.

FIG. 4 illustrates the charging valve of the present invention with a slightly modified valve spool 23a having a chamber 36a in one end. The chamber 36a communicates with the inlet conduit 27 to torque converter 26 by means of a radial bore 54 in the valve spool 23a at the axial location of the chamber 36a. The operation of this charging valve is essentially the same as that described above differing only in that the pressure in chamber 36a reflects the pressure at the inlet of torque converter 26, wherein the previously described embodiment included a chamber 36 which reflected the pressure at the outlet of the torque converter 26. Since the valve still operates to adjust the flow path at both the input and the output of the torque converter in response to changing pressure conditions at the inlet of the torque converter, the essential operation of the valve is unaltered. In normal operation the inlet pressure of the torque converter rather than the outlet pressure is held constant at a predetermined value.

Figure 7:
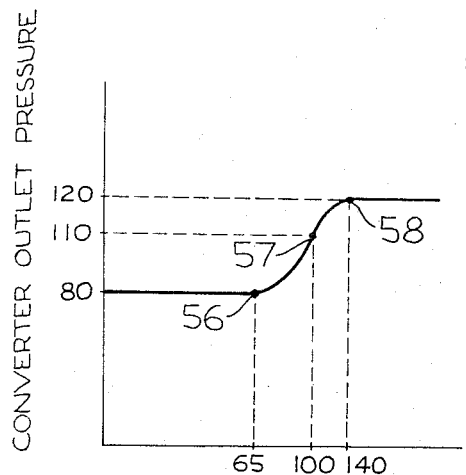
FIG. 7 is a graphic illustration of the relationship between torque converter outlet pressure and cooler inlet pressure under different operating conditions.

FIG. 7 is a graph showing the relationship between converter outlet pressure and cooler inlet pressure for the construction of FIGURES 1, 2 and 3 with relative pressure values given primarily for purposes of example. The point 56 represents the pressures which exist under normal operating conditions and, as previously mentioned, establishes approximately 80 p.s.i. at the outlet of the torque converter essentially independent of cooler pressure as long as it is lower than 65 p.s.i. Point 57 represents the cold weather starting conditions of FIG. 2 wherein the converter outlet pressure is increased (as is usual under these conditions) as is the cooler inlet pressure, but there is still a pressure drop between the outlet of the converter and the inlet of the cooler. Point 58 represents the extreme cold weather starting conditions where the inlet pressure to the cooler is greater than the desired maximum outlet pressure of the torque converter. The charging valve taught by the present invention, does enable the cooler inlet pressure to exceed the converter outlet pressure and thus provides the protection to the converter which is so necessary.

Figure 5:
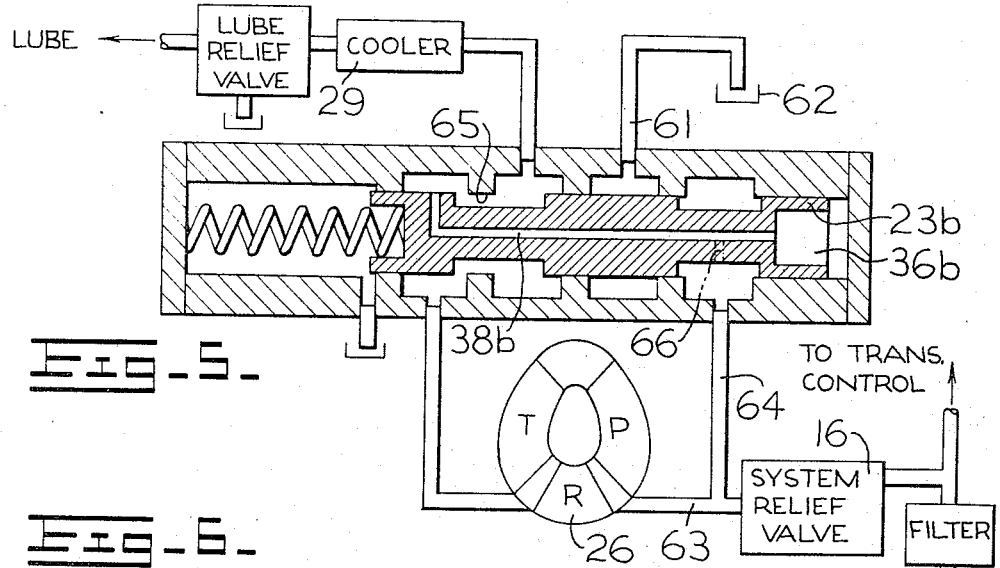
FIG. 5 illustrates in the same form as FIGS. 1, 2 and 4 a third embodiment of the invention wherein the cooler as well as the torque converter is protected from experiencing excessive fluid pressure.
Figure 6:
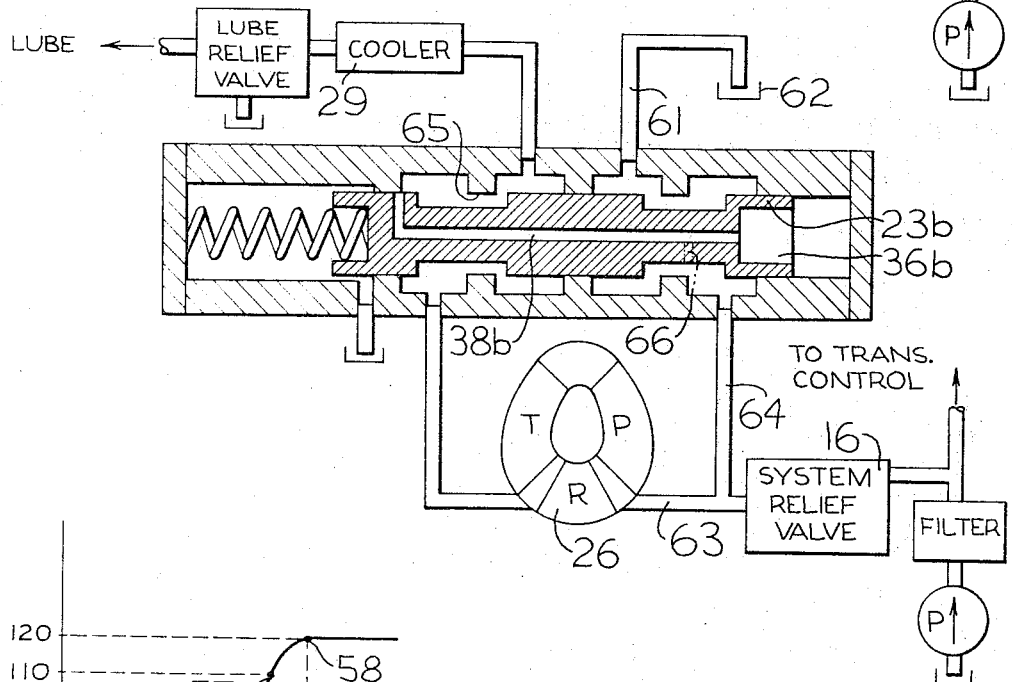
FIG. 6 illustrates in the same manner as FIG. 5 a torque converter charging valve which protects both the torque converter and cooler, but senses a different pressure for control purposes than the embodiment of FIG. 5.

FIGS. 5 and 6 illustrate a further embodiment of the present invention which prevents excessive pressures from being established at the inlet of cooler 29 as well as in torque converter 26. In the embodiments of FIGS. 5 and 6 the torque converter inlet conduit 63 is connected directly to the system relief valve 16 while a branch conduit 64 off of conduit 63 leads to the valve bore 65. Under normal operating conditions the valve is positioned as shown in FIG. 5 regulating the torque converter outlet pressure at a constant predetermined value. All the pump flow goes through the torque converter under this condition. However, leftward movement of the valve spool 23b which is caused by increased pressure in the torque converter outlet due to increased cooler restriction during cold weather starting establishes communication between branch conduit 64 and a low pressure sump 62 via branch line 61 whereby inlet fluid is diverted away from both the torque converter and cooler. This condition is shown in FIG. 6. The embodiment of FIGS. 5 and 6 operates by sensing the outlet pressure of the torque converter and adjusting the position of the valve spool 23b as a function thereof. By blocking the left end of passageway 38b within valve spool 23b and opening a passageway 66 (shown in broken lines) to communication with chamber 36b the valve spool 23b is positioned as a function of the inlet pressure rather than the outlet pressure to torque converter 26.

While the various embodiments of the invention are substantially equivalent in function, the particular form of valve chosen is dependent on the characteristics of the pressure changes across the particular torque converter being serviced, and also on whether or not a specific inlet pressure is desired.

I claim:

1. A charging valve for a torque converter which receives fluid from a fluid source through an inlet and discharges fluid to a heat exchanger through an outlet comprising in combination;

a valve housing defining a valve bore and a plurality of axially spaced lands in said bore, wherein said valve bore is disposed in a conduit which communicates the outlet of the torque converter with the heat exchanger, and in hydraulic communication with the fluid source; and a valve spool having a plurality of spaced apart lands formed thereon slidably disposed in said valve bore and responsive to increased pressure at the heat exchanger inlet to move axially in said valve bore and position valve spool lands relative to valve bore lands and thereby decrease the inlet flow to the torque converter.

2. The charging valve of claim 1 further comprising a low pressure sump in communication with said valve bore wherein said valve spool achieves a position in response to a given high pressure at the heat exchanger which positions the valve spool to block communication between the torque converter outlet and the heat exchanger and establish communication between the torque converter outlet and said low pressure sump.

3. The charging valve of claim 2 wherein said valve spool assumes a position in said valve bore as a function of the pressure at the inlet of the torque converter through means communicating the inlet of the torque converter with one end of said valve spool whereby the inlet fluid pressure acts to urge the valve spool axially in said valve bore.

4. The charging valve of claim 2 wherein said valve spool assumes a position in said valve bore as a function of the pressure at the outlet of the torque converter through means communicating the outlet of the torque converter with one end of said valve spool whereby the outlet fluid pressure acts to urge the valve spool axially in said valve bore.

5. The charging valve of claim 2 wherein the inlet fluid flow to the torque converter is decreased by the valve bore lands and valve spool lands cooperating to establish communication between the fluid source and the heat exchanger through said valve bore whereby fluid can flow from the source to the heat exchanger without passing through the torque converter.

6. The charging valve of claim 1 further comprising a low pressure inlet flow diversion sump communicating with said valve bore wherein the inlet fluid flow to the torque converter is decreased by the valve bore lands and valve spool lands cooperating to establish communication between the fluid source and said inlet flow diversion sump whereby both the torque converter and heat exchanger are protected against excessive pressures.

No references cited.

EDGAR W. GEOGHEGAN, *Primary Examiner.*